(12) United States Patent
Haag et al.

(10) Patent No.: US 8,178,989 B2
(45) Date of Patent: May 15, 2012

(54) SYSTEM AND METHODS FOR ADJUSTING A YAW ANGLE OF A WIND TURBINE

(75) Inventors: Christian Haag, Karlstad (SE); Frank Mikael Björk, Karlstad (SE); Detlef Menke, Lotte (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/968,525

(22) Filed: Dec. 15, 2010

(65) Prior Publication Data

US 2011/0210549 A1 Sep. 1, 2011

(51) Int. Cl.
*F03D 9/00* (2006.01)
*H02P 9/04* (2006.01)
*F03B 13/00* (2006.01)
*F03B 13/10* (2006.01)
*F03B 13/12* (2006.01)

(52) U.S. Cl. ............... 290/44; 290/43; 290/53; 290/54
(58) Field of Classification Search .................. 290/43, 290/44, 53, 54
See application file for complete search history.

(56) References Cited

U.S. PATENT DOCUMENTS

| | | | |
|---|---|---|---|
| 4,333,018 A | 6/1982 | Bottrell | 290/55 |
| 4,515,525 A * | 5/1985 | Doman | 416/11 |
| 4,692,094 A * | 9/1987 | Kulinyak | 416/11 |
| 4,815,936 A * | 3/1989 | Stoltze et al. | 416/9 |
| 5,289,041 A * | 2/1994 | Holley | 290/44 |
| 6,441,507 B1 | 8/2002 | Deering et al. | 290/44 |
| 6,909,198 B2 * | 6/2005 | Ragwitz et al. | 290/44 |
| 7,071,578 B1 | 7/2006 | Shibata et al. | 290/55 |
| 7,101,152 B2 | 9/2006 | Wobben | 416/1 |
| 7,244,100 B2 | 7/2007 | Yoshida | 416/9 |
| 7,677,075 B2 | 3/2010 | Nies | 73/1.01 |
| 7,854,069 B2 * | 12/2010 | Gao | 33/333 |
| 7,895,018 B2 * | 2/2011 | Nies | 702/188 |
| 8,022,566 B2 * | 9/2011 | Loh et al. | 290/44 |
| 8,035,240 B2 * | 10/2011 | Erdman et al. | 290/44 |
| 8,035,241 B2 * | 10/2011 | Subramanian et al. | 290/44 |
| 8,053,916 B2 * | 11/2011 | Edwards et al. | 290/44 |
| 8,057,102 B2 * | 11/2011 | Becker et al. | 384/428 |
| 8,057,174 B2 * | 11/2011 | Scholte-Wassink | 416/35 |
| 8,082,115 B2 * | 12/2011 | Bechhoefer et al. | 702/34 |
| 2006/0216148 A1 | 9/2006 | Wobben | 416/1 |
| 2007/0183885 A1 | 8/2007 | Ormel et al. | 415/4.1 |
| 2009/0039651 A1 * | 2/2009 | Stiesdal | 290/44 |
| 2009/0068013 A1 * | 3/2009 | Birkemose et al. | 416/31 |
| 2009/0243295 A1 * | 10/2009 | Kammer et al. | 290/44 |
| 2009/0263245 A1 * | 10/2009 | Shi et al. | 416/43 |
| 2010/0054939 A1 | 3/2010 | Hoffmann | 416/10 |
| 2010/0133825 A1 * | 6/2010 | Gao | 290/44 |

(Continued)

*Primary Examiner* — Pedro J Cuevas
(74) *Attorney, Agent, or Firm* — James McGinness, Esq.; Armstrong Teasdale LLP (57) ABSTRACT

A method of adjusting a yaw angle of a wind turbine. The wind turbine includes a nacelle that is rotatably coupled to a tower. The method includes coupling a yaw drive assembly to the nacelle for adjusting an orientation of the nacelle with respect to a direction of wind. A first sensor that is coupled to the wind turbine transmits at least a first monitoring signal that is indicative of an operating condition of the wind turbine to a control system. A yaw angle of the nacelle with respect to the direction of wind is calculated by the control system based at least in part on the first monitoring signal. The yaw drives assembly is operated to adjust a yaw of the nacelle based at least in part on the calculated yaw angle.

16 Claims, 4 Drawing Sheets

U.S. PATENT DOCUMENTS

| | | | |
|---|---|---|---|
| 2011/0015878 A1* | 1/2011 | LaVigne et al. | 702/41 |
| 2011/0044811 A1* | 2/2011 | Bertolotti | 416/1 |
| 2011/0076142 A1* | 3/2011 | Veldkamp et al. | 416/1 |
| 2011/0285129 A1* | 11/2011 | Li et al. | 290/44 |
| 2011/0296913 A1* | 12/2011 | Ohms et al. | 73/504.12 |
| 2011/0311359 A1* | 12/2011 | Bjork et al. | 416/1 |
| 2011/0318178 A1* | 12/2011 | Andersen | 416/1 |

* cited by examiner

SYSTEM AND METHODS FOR ADJUSTING A YAW ANGLE OF A WIND TURBINE

BACKGROUND OF THE INVENTION

The embodiments described herein relate generally to a system and methods for adjusting a yaw of a wind turbine.

At least some known wind turbines include a nacelle fixed on a tower. The nacelle includes a rotor assembly coupled to a generator through a shaft. In known rotor assemblies, a plurality of rotor blades extend from a rotor. The rotor blades are oriented such that wind passing over the rotor blades turns the rotor and rotates the shaft, thereby driving the generator to generate electricity. At least some known nacelles include a yaw system for controlling a perspective of the rotor relative to a direction of wind.

At least some known wind turbines include sensors positioned atop the nacelle for sensing a direction of the wind. At least some known sensors are positioned downwind of the rotor. During operation of known wind turbines, the direction of wind is altered as the wind passes through the rotor. Because the wind direction is altered, the sensed wind direction is different than the actual direction of wind that strikes the rotor.

At least some known yaw systems adjust the yaw of the wind turbine based on the sensed wind direction. Because the sensed wind direction is different than the actual wind direction, known yaw systems may not align the nacelle with respect to the actual direction of the wind. The misalignment of the nacelle may result in known wind turbines being subjected to increased loads (e.g., asymmetric loads) that result from yaw misalignment which may contribute to significant fatigue cycles on the wind turbine components. As the wind turbine components become worn, the wind turbine becomes less effective.

BRIEF DESCRIPTION OF THE INVENTION

In one aspect, a method of adjusting a yaw angle of a wind turbine is provided. The wind turbine includes a nacelle that is rotatably coupled to a tower. The method includes coupling a yaw drive assembly to the nacelle for adjusting an orientation of the nacelle with respect to a direction of wind. A first sensor that is coupled to the wind turbine transmits at least a first monitoring signal that is indicative of an operating condition of the wind turbine to a control system. A yaw angle of the nacelle with respect to the direction of wind is calculated by the control system based at least in part on the first monitoring signal. The yaw drives assembly is operated to adjust a yaw of the nacelle based at least in part on the calculated yaw angle.

In another aspect, a yaw system for use with a wind turbine is provided. The wind turbine includes a nacelle that is rotatably coupled to a tower. The yaw system includes a yaw drive assembly that is coupled to the nacelle. The yaw drive assembly is configured to rotate the nacelle about a yaw axis. A first sensor is coupled to the wind turbine. The first sensor is configured to sense an operating condition of the wind turbine and to generate at least a first monitoring signal indicative of the sensed operating condition. A control system is communicatively coupled to the sensor for receiving the generated first monitoring signal from the first sensor. The control system is configured to calculate a yaw angle of the nacelle with respect to a direction of wind based on the received first monitoring signal.

In yet another aspect, a wind turbine system is provided. The wind turbine system includes a tower, a nacelle that is rotatably coupled to the tower, a yaw bearing that is coupled between the nacelle and the tower, and a yaw drive assembly that is coupled to the nacelle. The yaw drive assembly is configured to rotate the nacelle about a yaw axis. A first is coupled to the wind turbine. The first sensor is configured to sense an operation of the wind turbine and to generate at least a first monitoring signal indicative of the sensed operating condition. A control system is communicatively coupled to the sensor for receiving the generated first monitoring signal from the first sensor. The control system is configured to calculate a yaw angle of the nacelle with respect to a direction of wind based on the received first monitoring signal.

DETAILED DESCRIPTION OF THE INVENTION

The embodiments described herein include a yaw system that facilitates adjusting a yaw of a wind turbine based on a sensed torque loading of a yaw drive assembly. More specifically, the yaw system described herein includes a control system that is configured to calculate a yaw angle of a nacelle with respect to a direction of wind based at least in part on a sensed torque loading of the yaw drive assembly.

Figure 1:
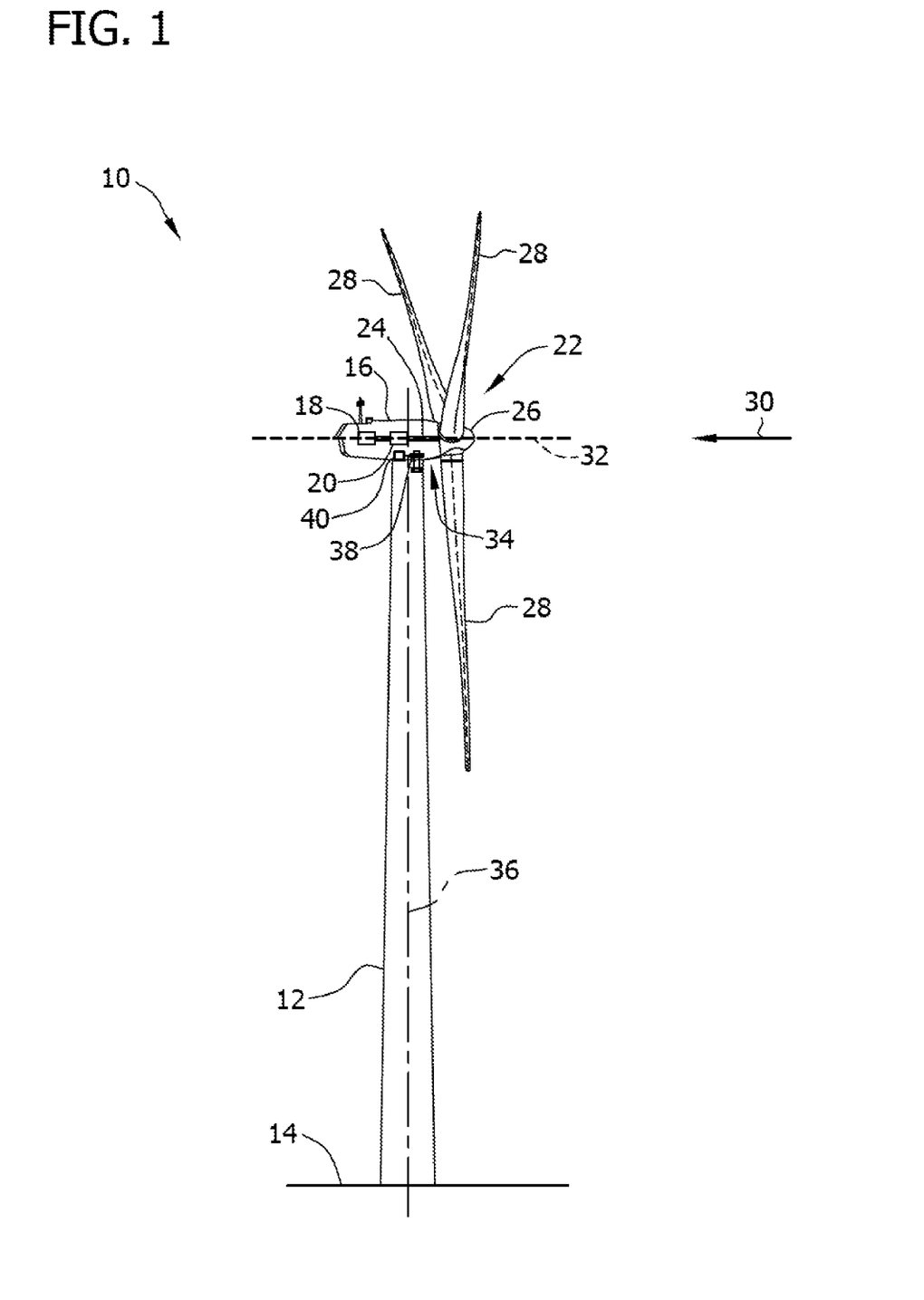
FIG. 1 is a perspective view of an exemplary wind turbine.

FIG. 1 is a perspective view of an exemplary wind turbine 10. In the exemplary embodiment, wind turbine 10 is a horizontal-axis wind turbine. Alternatively, wind turbine 10 may be a vertical-axis wind turbine. In the exemplary embodiment, wind turbine 10 includes a tower 12 that extends from a supporting surface 14, a nacelle 16 mounted on tower 12, a generator 18 positioned within nacelle 16, and a gearbox 20 that is coupled to generator 18. A rotor 22 is rotatably coupled to gearbox 20 with a rotor shaft 24. Rotor 22 includes a rotatable hub 26 and at least one rotor blade 28 coupled to and extending outwardly from hub 26.

In the exemplary embodiment, rotor 22 includes three rotor blades 28. In an alternative embodiment, rotor 22 includes more or less than three rotor blades 28. In the exemplary embodiment, tower 12 is fabricated from tubular steel to define a cavity (not shown in FIG. 1) that extends between supporting surface 14 and nacelle 16. In an alternative embodiment, tower 12 is any suitable type of tower having any suitable height.

Rotor blades 28 are spaced about hub 26 to facilitate rotating rotor 22 to enable kinetic energy to be transferred from the wind into usable mechanical energy, and subsequently, electrical energy. In the exemplary embodiment, each rotor blade 28 has a length ranging from about 30 meters (m) (99 feet (ft)) to about 120 m (394 ft). Alternatively, rotor blades 28 may have any suitable length that enables wind turbine 10 to function as described herein. For example, other non-limiting examples of rotor blade lengths include 10 m or less, 20 m, 37 m, or a length that is greater than 120 m. As wind strikes rotor blades 28 from a direction 30, rotor 22 is rotated about an axis of rotation 32.

In the exemplary embodiment, a yaw system 34 is coupled to nacelle 16 and to tower 12 to adjust a yaw of nacelle 16. As used herein, the term "yaw" refers to an orientation of nacelle 16 with respect to wind direction 30. In the exemplary embodiment, yaw system 34 is configured to selectively rotate nacelle 16 and rotor 22 with respect to tower 12 about a yaw axis 36 to control the perspective of rotor 22 with respect to wind direction 30.

Figure 2:
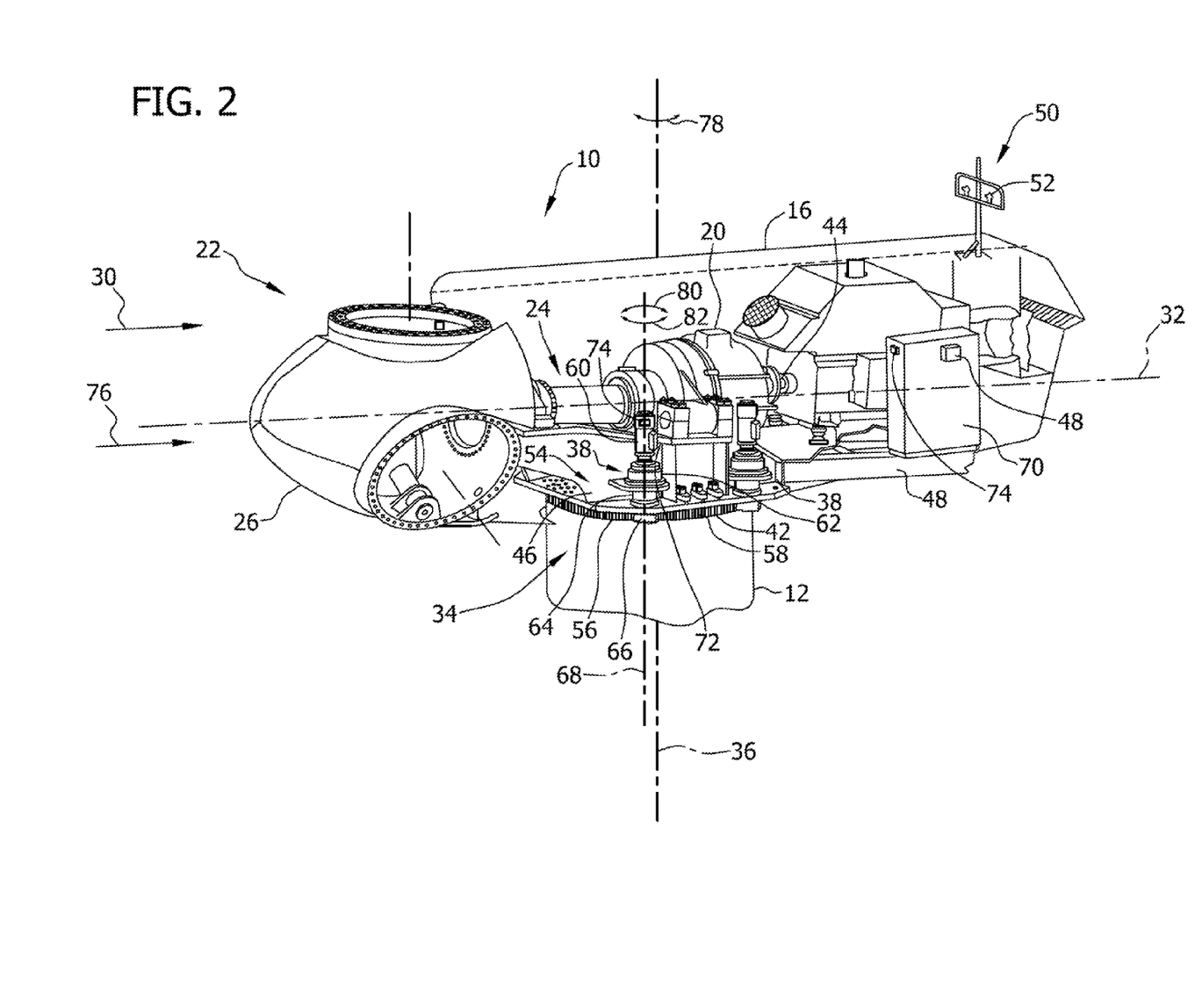
FIG. 2 is an enlarged perspective view of a portion of the wind turbine shown in FIG. 1 including an exemplary yaw assembly.

FIG. 2 is an enlarged perspective view of a portion of wind turbine 10. In the exemplary embodiment, yaw system 34 includes at least one yaw drive assembly 38 and a control system 40 that is operatively coupled to yaw drive assembly 38. Yaw drive assembly 38 is coupled to a yaw bearing 42. Yaw bearing 42 is coupled between nacelle 16 and tower 12 to facilitate rotating nacelle 16 with respect to tower 12 about yaw axis 36 (shown in FIG. 1). Rotor shaft 24 is positioned within nacelle 16 and is coupled between rotor 22 and gearbox 20. More specifically, rotor shaft 24 is coupled to hub 26 such that a rotation of hub 26 about axis of rotation 32 facilitates rotating rotor shaft 24 about axis of rotation 32. A high speed shaft 44 is coupled between gearbox 20 and generator 18. In the exemplary embodiment, during operation of wind turbine 10, a rotation of rotor shaft 24 rotatably drives gearbox 20 that subsequently drives high speed shaft 44. High speed shaft 44 rotatably drives generator 18 to facilitate production of electrical power by generator 18. Gearbox 20, rotor shaft 24, and yaw drive assembly 38 are each supported by a bedplate support frame 46. Generator 18 is supported by a generator frame 48 that is cantilevered from bedplate support frame 46. Nacelle 16 also includes at least one meteorological mast 50 that includes at least one sensor 52, such as an anemometer. Sensor 52 is configured to sense a wind velocity and transmit a signal indicative of the wind velocity to control system 40. Alternatively, sensor 52 may be configured to sense a plurality of environmental conditions such as, for example, a temperature, a humidity, and/or a barometric pressure. In such an embodiment, sensor 52 is configured to transmit a signal indicative of the environmental conditions of wind to control system 40.

In the exemplary embodiment, yaw bearing 42 is coupled to bedplate support frame 46 and to tower 12. Yaw bearing 42 is configured to enable nacelle 16 to rotate with respect to tower 12. In the exemplary embodiment, yaw bearing 42 includes an inner race 54 (not shown) that is rotatably coupled to an outer race 56 such that inner race 54 rotates relative to outer race 56 about yaw axis 36. Inner race 54 is coupled to bedplate support frame 46. Outer race 56 is securely coupled to tower 12, or integrated with tower 12. Outer race 56 includes a plurality of bearing teeth 58 that are spaced circumferentially about outer race 56. Bearing teeth 58 engage yaw drive assembly 38 such that an operation of yaw drive assembly 38 rotates inner race 54 with respect to outer race 56 and rotates nacelle 16 about yaw axis 36. Alternatively, outer race 56 may be coupled to bedplate support frame 46 and yaw drive assembly 38 may be configured to engage inner race 54 to rotate outer race 56 with respect to inner race 54.

In the exemplary embodiment, yaw drive assembly 38 includes a yaw drive motor 60, a yaw gearbox 62 that is coupled to yaw drive motor 60, a yaw drive shaft 64 that is rotatably coupled to yaw gearbox 62, and a yaw pinion 66 that is coupled to yaw drive shaft 64. Yaw drive motor 60 is configured to impart a mechanical force to yaw gearbox 62. Yaw gearbox 62 is configured to convert the mechanical force into a rotational force, and to impart the rotational force to yaw drive shaft 64. Yaw drive shaft 64 is coupled between yaw gearbox 62 and yaw pinion 66. During operation of yaw drive assembly 38, yaw drive motor 60 imparts a mechanical force to yaw gearbox 62, which in turn translates the force into rotational energy. Yaw gearbox 62 then rotates yaw drive shaft 64 about a yaw drive axis 68. Yaw drive shaft 64 rotates yaw pinion 66 about yaw drive axis 68, such that yaw pinion 66 engages yaw bearing 42 and causes nacelle 16 to rotate about yaw axis 36. In one embodiment, yaw drive assembly 38 includes a power frequency converter 70 that is electrically coupled to yaw drive motor 60. In such an embodiment, power frequency converter 70 is configured to receive AC power or DC power from a power source, for example, generator 18, a power grid system (not shown) and/or another wind turbine (not shown), and transmit the power to yaw drive motor 60. In an alternative embodiment, yaw drive assembly 38 does not include power frequency converter 70. In this alternative embodiment, yaw drive motor 60 is configured to receive power directly from the power source.

In the exemplary embodiment, yaw drive assembly 38 is coupled to bedplate support frame 46 such that at least a portion of yaw drive shaft 64 is positioned adjacent to yaw bearing 42. Yaw pinion 66 is coupled to yaw drive shaft 64 such that yaw pinion 66 is in contact with yaw bearing 42. More specifically, yaw pinion 66 is configured to engage bearing teeth 58 such that as yaw pinion 66 rotates, nacelle 16 rotates about yaw axis 36. More specifically, in the exemplary embodiment, bearing teeth 58 engage yaw drive assembly 38 such that yaw drive assembly 38 operates to rotate inner race 54 with respect to outer race 56 to rotate nacelle 16 about yaw axis 36. Alternatively, outer race 56 may be coupled to bedplate support frame 46 with yaw drive assembly 38 engaging inner race 54 to rotate outer race 56 with respect to inner race 54.

In the exemplary embodiment, yaw drive assembly 38 includes at least one torque sensor 72 that is coupled to yaw drive assembly 38 for sensing a torque loading of yaw drive assembly 38. Torque sensor 72 is configured to transmit a signal indicative of a torque loading imparted to yaw drive assembly 38 from nacelle 16 to control system 40. In one embodiment, torque sensor 72 is coupled to yaw drive motor 60. Alternatively, torque sensor 72 is coupled to yaw gearbox 62, yaw drive shaft 64, and/or yaw pinion 66. Yaw drive assembly 38 also includes at least one power output sensor 74 coupled to yaw drive assembly 38. Power output sensor 74 is configured to sense a power output of yaw drive assembly 38 and to transmit a signal indicative of the power output to control system 40. Power output sensor 74 is configured to sense a power characteristic such as, for example, a power frequency, a power voltage, and/or a power current. In one embodiment, power output sensor 74 is coupled to yaw drive motor 60 for sensing an amount of power received from a power grid and/or power frequency converter 70. Alternatively, power output sensor 74 is coupled to power frequency converter 70 for sensing a power transmitted to yaw drive motor 60 from power frequency converter 70.

During operation of yaw drive assembly 38, yaw drive motor 60 imparts a mechanical force to yaw gearbox 62, which in turn translates the force into rotational energy. Yaw gearbox 62 then rotates yaw drive shaft 64 about yaw drive axis 68. Yaw drive motor 60 imparts a torque loading to yaw drive shaft 64 to rotate yaw pinion 66 about yaw drive axis 68. As yaw pinion 66 rotates, yaw pinion 66 engages yaw bearing 42 and causes nacelle 16 to rotate about yaw axis 36. As wind strikes rotor 22, a velocity of wind, represented by arrow 76, imparts a rotational moment, represented by arrow 78, to rotor 22 and to nacelle 16. A first torque loading, represented by arrows 80, is imparted to yaw drive assembly 38 from rotational moment 78. In the exemplary embodiment, yaw drive assembly 38 imparts a second torque loading, represented by arrow 82, to yaw drive motor 60 in an opposite direction of first torque loading 80 to facilitate preventing a rotation of nacelle 16 about yaw axis 36 to maintain an orientation of nacelle 16 with respect to wind direction 30. As wind velocity 76 increases, first torque loading 80 increases. Yaw drive assembly 38, in turn, increases second torque loading 82 imparted to yaw drive motor 60 to facilitate maintaining the orientation of nacelle 16 with respect to wind direction 30.

In the exemplary embodiment, as wind direction 30 changes, first torque loading 80 may increase, decrease, and/or change direction. Yaw drive assembly 38, in turn, increases, decreases, and/or changes a direction of second torque loading 82 imparted to yaw drive motor 60 to facilitate maintaining an orientation of nacelle 16 with respect to wind direction 30. In the exemplary embodiment, when second torque loading 82 is greater than a predefined torque loading, yaw drive assembly 38 rotates nacelle 16 about yaw axis 36 such that second torque loading 82 is equal to, or less than the predefined torque loading.

Figure 3:
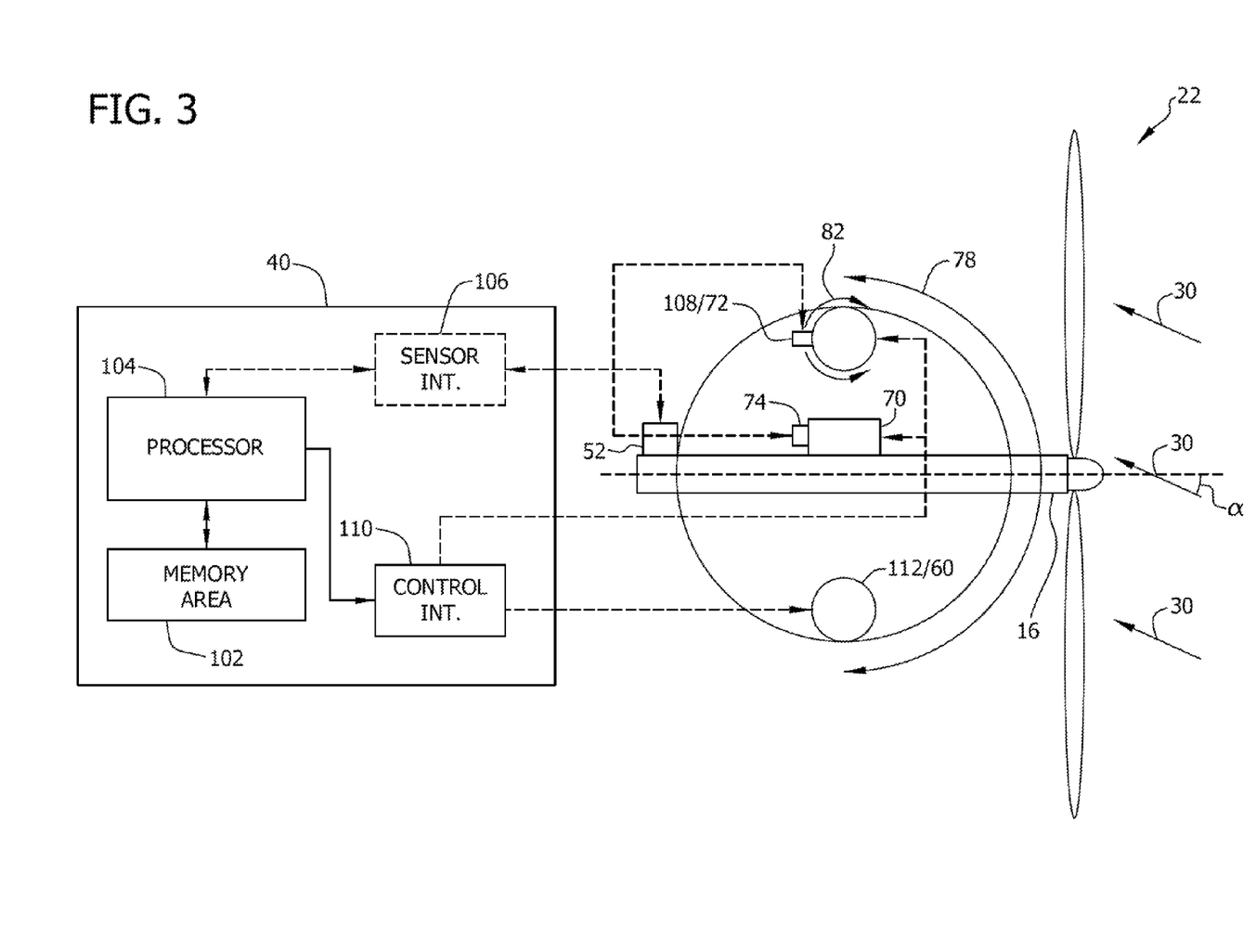
FIG. 3 is a schematic view of the yaw assembly shown in FIG. 2 including an exemplary control system.

FIG. 3 is a schematic view of yaw system 34 including control system 40. Identical components shown in FIG. 3 are labeled with the same reference numbers used in FIG. 2. In the exemplary embodiment, control system 40 is a real-time controller that includes any suitable processor-based or microprocessor-based system, such as a computer system, that includes microcontrollers, reduced instruction set circuits (RISC), application-specific integrated circuits (ASICs), logic circuits, and/or any other circuit or processor that is capable of executing the functions described herein. In one embodiment, control system 40 may be a microprocessor that includes read-only memory (ROM) and/or random access memory (RAM), such as, for example, a 32 bit microcomputer with 2 Mbit ROM and 64 Kbit RAM. As used herein, the term "real-time" refers to outcomes occurring at a substantially short period of time after a change in the inputs affect the outcome, with the time period being a design parameter that may be selected based on the importance of the outcome and/or the capability of the system processing the inputs to generate the outcome.

In the exemplary embodiment, control system 40 includes a memory area 102 configured to store executable instructions and/or one or more operating parameters representing and/or indicating an operating condition of wind turbine 10. Operating parameters may represent and/or indicate, without limitation, a wind speed, a wind temperature, a torque loading, a power output, and/or a wind direction. Control system 40 further includes a processor 104 that is coupled to memory area 102 and is programmed to determine an operation of one or more wind turbine control devices 112, for example, yaw drive motor 60, based at least in part on one or more operating parameters. In one embodiment, processor 104 may include a processing unit, such as, without limitation, an integrated circuit (IC), an application specific integrated circuit (ASIC), a microcomputer, a programmable logic controller (PLC), and/or any other programmable circuit. Alternatively, processor 104 may include multiple processing units (e.g., in a multi-core configuration).

In the exemplary embodiment, control system 40 includes a sensor interface 106 that is coupled in signal communication with at least one sensor 108 such as, for example, sensor 52, torque sensor 72, and power output sensor 74. In the exemplary embodiment, each sensor 108 detects various operating conditions of wind turbine 10. Sensors 108 may include, but are not limited to only including, position sensors, acceleration sensors, vibration sensors, strain gauges and/or any other sensors that sense various parameters relative to the operation of wind turbine 10. As used herein, the term "parameters" refers to physical properties whose values can be used to define the operating conditions of wind turbine 10, such as vibrations, rotor speed, and rotor blade deflections at defined locations. Each sensor generates and transmits a signal corresponding to an operating parameter of wind turbine 10. Moreover, each sensor may transmit a signal continuously, periodically, or only once, for example, though other signal timings are also contemplated. Furthermore, each sensor may transmit a signal either in an analog form or in a digital form. Control system 40 processes the signal(s) by processor 104 to create one or more operating parameters. In some embodiments, processor 104 is programmed (e.g., with executable instructions in memory area 102) to sample a signal produced by sensor. For example, processor 104 may receive a continuous signal from sensor and, in response, calculate an operating parameter of wind turbine 10 based on the continuous signal periodically (e.g., once every five seconds). In some embodiments, processor 104 normalizes a signal received from sensor 108. For example, sensor 108 may produce an analog signal with a parameter (e.g., voltage) that is directly proportional to an operating parameter value. Processor 104 may be programmed to convert the analog signal to the operating parameter. In one embodiment, sensor interface 106 includes an analog-to-digital converter that converts an analog voltage signal generated by sensor 108 to a multi-bit digital signal usable by control system 40.

Control system 40 also includes a control interface 110 that is configured to control an operation of yaw drive assembly 38. In some embodiments, control interface 110 is operatively coupled to one or more wind turbine control devices 112, for example, yaw drive motor 60.

Various connections are available between control interface 110 and control device 112 and between sensor interface 106 and sensor 108. Such connections may include, without limitation, an electrical conductor, a low-level serial data connection, such as Recommended Standard (RS) 232 or RS-485, a high-level serial data connection, such as Universal Serial Bus (USB) or Institute of Electrical and Electronics Engineers (IEEE) 1394 (a/k/a FIREWIRE), a parallel data connection, such as IEEE 1284 or IEEE 488, a short-range wireless communication channel such as BLUETOOTH, and/or a private (e.g., inaccessible outside wind turbine 10) network connection, whether wired or wireless.

During operation of wind turbine 10, control system 40 receives from one or more sensors 108 signals indicative of an operating condition, such as, for example a rotational speed of rotor shaft 24, of wind turbine 10. Control system 40 is configured to calculate a yaw angle α of nacelle 16 based at least in part on the sensed operating condition. As used herein, the term "yaw angle" refers to an angle as measured between axis of rotation 32 and wind direction 30. Alternatively, yaw angle may be measured between yaw axis 36 and wind direction 30, or measured with respect to axis of rotation 32, yaw axis 36, and wind direction 30. In the exemplary embodiment, control system 40 is further configured to compare the calculated yaw angle α with a predefined yaw angle and/or a predefined range of yaw angle values. If the calculated yaw angle α is different than a predefined yaw angle and/or is not within a predefined range of yaw angle values, control system 40 operates yaw drive assembly 38 to adjust a yaw of nacelle 16. Alternatively, yaw drive assembly 38 rotates nacelle 16 about yaw axis 36 until the calculated yaw angle α is substantially equal to a predefined yaw angle or is within a predefined range of yaw angle values. In one embodiment, control system 40 receives from sensor 52 signals indicative of wind velocity 76 and receives from torque sensor 72 signals indicative of torque loading 82 of yaw drive assembly 38. Control system 40 is configured to calculate a yaw angle α of nacelle 16 based at least in part on a velocity of wind and the torque loading of yaw drive assembly 38.

In an alternative embodiment, control system 40 is configured to determine that a calculated yaw angle α is different than a predefined yaw angle if sensed torque loading 82 of yaw drive assembly 38 is different than a predefined torque loading. In this embodiment, control system 40 is configured to operate yaw drive assembly 38 to adjust a yaw of nacelle 16 until sensed torque loading 82 is less than or equal to a predefined torque loading.

In an alternative embodiment, control system 40 receives from power output sensor 74 signals indicative of a power output of yaw drive assembly 38 and/or power frequency converter 70. Control system 40 is configured to calculate torque loading 82 of yaw drive assembly 38 based at least in part on a power output of yaw drive assembly 38 and/or power frequency converter 70. In a further alternative embodiment, control system 40 is configured to determine that a calculated yaw angle α is different than a predefined yaw angle if a sensed power output is greater than a predefined power output. In this alternative embodiment, control system 40 is configured to operate yaw drive assembly 38 to adjust a yaw of nacelle 16 until a sensed power output is less than or substantially equal to a predefined power output.

Figure 4:
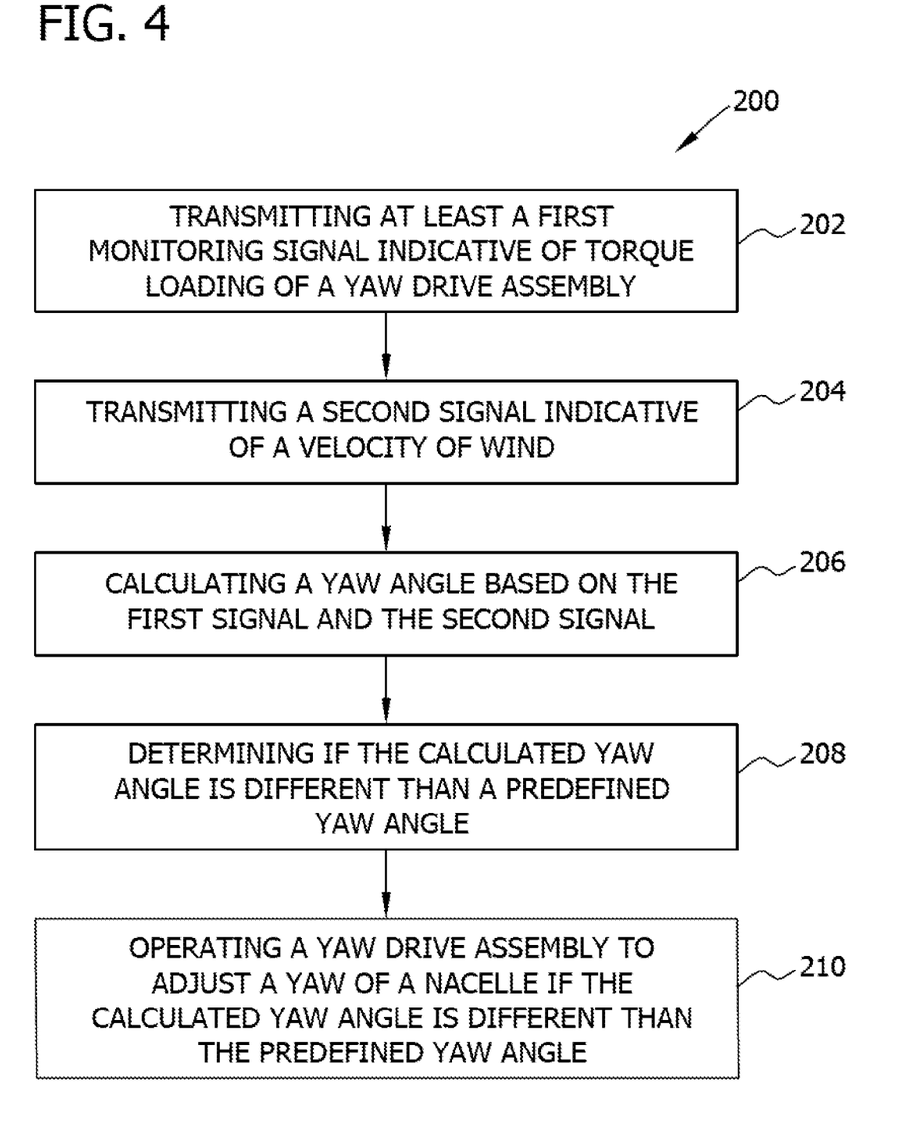
FIG. 4 is a flow chart illustrating an exemplary method of adjusting a yaw of the wind turbine shown in FIG. 1.

FIG. 4 is a flow chart illustrating an exemplary method 200 of adjusting a yaw of wind turbine 10. In the exemplary embodiment, method 200 includes transmitting 202, by sensor 108 to control system 40, at least a first monitoring signal indicative of torque loading 82 of yaw drive assembly 38. At least a second monitoring signal indicative of wind velocity 76 is transmitted 204, by sensor 108 to control system 40. Control system 40 calculates 206 yaw angle α of nacelle 16 based at least in part on the first monitoring signal and/or the second monitoring signal. Control system 40 determines 208 if the calculated yaw angle α is different than a predefined yaw angle and operates 210 yaw drive assembly 38 to adjust a yaw of nacelle 16 upon determining 208 that the calculated yaw angle α is different than a predefined yaw angle. In one embodiment, sensor 108 transmits 212 the second signal that is indicative of a power output of yaw drive assembly 38 to control system 40. In this embodiment, control system 40 calculates torque loading 82 based at least in part on the sensed power output. Control system 40 determines 214 if the calculated torque loading 82 is different than a predefined torque loading and operates 216 yaw drive assembly 38 to adjust a yaw of nacelle 16 upon determining 214 that the calculated torque loading 82 is different than a predefined torque loading.

An exemplary technical effect of the method, system, and apparatus described herein includes at least one of: (a) transmitting, from a first sensor to a control system, at least a first monitoring signal indicative of a torque loading of the yaw drive assembly; (b) calculating a yaw angle of the nacelle with respect to a direction of wind based at least in part on the first monitoring signal; and (c) operating the yaw drive assembly to adjust a yaw of the nacelle upon determining the calculated yaw angle is different than a predefined yaw angle.

The above-described method, system, and apparatus facilitate adjusting a yaw of a wind turbine nacelle based on a torque loading of a yaw drive assembly. Moreover, the embodiments described herein facilitate calculating a yaw angle of the nacelle with respect to a direction of wind based at least in part on a sensed torque loading of the yaw drive system. By calculating the yaw angle based on the torque loading of the yaw drive system, the above-described method, system, and apparatus overcome the problem of known wind turbines that rely on wind direction sensors that are adversely affected by the rotation of the rotor. As such, the embodiments described herein facilitate improving the operation of the wind turbine to increase the annual energy production of the wind turbine.

Exemplary embodiments of a method, system, and apparatus for adjusting a yaw of a wind turbine are described above in detail. The systems and methods are not limited to the specific embodiments described herein, but rather, components of the system and/or steps of the methods may be utilized independently and separately from other components and/or steps described herein. For example, the methods may also be used in combination with other rotating systems, and are not limited to practice with only the yaw system as described herein. Rather, the exemplary embodiment can be implemented and utilized in connection with many other rotating system applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of adjusting a yaw angle of a wind turbine, the wind turbine including a nacelle rotatably coupled to a tower and a yaw drive assembly coupled to the nacelle and the tower, the yaw assembly including a yaw motor and a power converter assembly coupled to the yaw motor, said method comprising:
    transmitting, from a first sensor coupled to the wind turbine to a control system, at least a first monitoring signal indicative of an operating condition of the wind turbine;
    transmitting, from a second sensor to the control system, at least a second monitoring signal indicative of a power loading imparted to the yaw motor from the power converter assembly;
    calculating, by a control system, a torque loading of the yaw drive assembly based at least in part on the received second monitoring signal;
    calculating a yaw angle of the nacelle with respect to the direction of wind based at least in part on the calculated torque loading;
    determining whether the calculated yaw angle is different than a predefined yaw angle; and,
    operating the yaw drive the assembly to adjust a yaw of the nacelle based at least in part when the calculated yaw angle is different than the predefined yaw angle.

2. A method in accordance with claim 1, further comprising:
    transmitting, from a third sensor coupled to the yaw drive assembly to the control system, at least a third monitoring signal indicative of a torque loading of the yaw drive assembly; and,
    calculating the yaw angle based at least in part on sensed torque loading.

3. A method in accordance with claim 2, further comprising determining that the calculated yaw angle is different than the predefined yaw angle when the sensed torque loading is different than a predefined torque loading.

4. A method in accordance with claim 1, further comprising operating the yaw drive assembly upon determining that the calculated torque loading is greater than a predefined torque loading.

5. A yaw system for use with a wind turbine, the wind turbine including a nacelle rotatably coupled to a tower, said yaw assembly comprising:
   a yaw drive assembly coupled to the nacelle to rotate the nacelle about a yaw axis, said yaw drive assembly comprising a yaw motor and a power converter assembly coupled to said yaw motor;
   a first sensor coupled to the wind turbine, said first sensor configured to sense an operating condition of the wind turbine and to generate at least a first monitoring signal indicative of the operating condition;
   a second sensor configured to sense a power loading imparted to said yaw motor from said power converter assembly and to generate a second monitoring signal indicative of the power loading; and,
   a control system communicatively coupled to said first sensor and said second sensor, said control system configured to:
      calculate a torque loading of the yaw drive assembly based at least in part on the received second monitoring signal; and,
      calculate a yaw angle of the nacelle with respect to a direction of wind based on the sensed wind turbine operating condition and the calculated torque loading.

6. A yaw system in accordance with claim 5, further comprising a third sensor coupled to said yaw drive assembly, the third sensor configured to sense a torque loading of the yaw drive assembly and to transmit to said control system a monitoring signal indicative of the sensed torque loading, said control system configured to calculate the yaw angle based on the sensed torque loading.

7. A yaw system in accordance with claim 6, wherein said control system is operatively coupled to said yaw drive assembly, said control system configured to operate said yaw drive assembly upon determining that the calculated yaw angle is different than a predefined yaw angle.

8. A yaw system in accordance with claim 7, wherein said control system is further configured to operate said yaw drive assembly to adjust the yaw of the nacelle until the calculated yaw angle is substantially equal to the predefined yaw angle.

9. A yaw system in accordance with claim 8, wherein said control system is further configured to determine that the calculated yaw angle is different than the predefined yaw angle upon determining that the sensed torque loading is greater than a predefined torque loading.

10. A yaw system in accordance with claim 9, wherein said control system is configured to operate said yaw drive assembly upon determining that the sensed torque loading is different than the predefined torque loading.

11. A yaw system in accordance with claim 5, wherein said control system is further configured to operate said yaw drive assembly to adjust the yaw angle upon determining that the sensed power loading is different than a predefined power loading.

12. A wind turbine system, comprising:
   a tower;
   a nacelle rotatably coupled to said tower;
   a yaw bearing coupled between said nacelle and said tower;
   a yaw drive assembly coupled to said nacelle to rotate said nacelle about a yaw axis, said yaw drive assembly comprising a yaw motor and a power converter assembly coupled to said yaw motor;
   a first sensor coupled to said wind turbine, said first sensor configured to sense an operating condition of said wind turbine and to generate at least a first monitoring signal indicative of the sensed operating condition;
   a second sensor configured to sense a power loading imparted to said yaw motor from said power converter assembly and to generate a second monitoring signal indicative of the power loading; and,
   a control system communicatively coupled to said first sensor and said second sensor, said control system configured to:
      calculate a torque loading of the yaw drive assembly based at least in part on the received second monitoring signal; and,
      calculate a yaw angle of the nacelle with respect to a direction of wind based on the sensed wind turbine operating condition and the calculated torque loading.

13. A wind turbine in accordance with claim 12, wherein said control system is operatively coupled to said yaw drive assembly, said control system configured to operate said yaw drive assembly upon determining that the calculated yaw angle is different than a predefined yaw angle.

14. A wind turbine in accordance with claim 13, wherein said control system is further configured to operate said yaw drive assembly to adjust a yaw of said nacelle until the calculated yaw angle is substantially equal to the predefined yaw angle.

15. A wind turbine in accordance with claim 14, further comprising a third sensor coupled to said yaw drive assembly and configured to sense a torque loading of said yaw drive assembly, said control system further configured to determine that the calculated yaw angle is different than the predefined yaw angle upon determining that the sensed torque loading is different than a predefined torque loading.

16. A wind turbine in accordance with claim 15, wherein said control system is configured to operate said yaw drive assembly upon determining that the sensed torque loading is different than a predefined torque loading.

* * * * *